United States Patent [19]

Mitchell

[11] Patent Number: 5,991,460
[45] Date of Patent: Nov. 23, 1999

[54] NAVIGATION SYSTEM USING HYBRID SENSOR CORRELATION SYSTEM

[75] Inventor: James P. Mitchell, Cedar Rapids, Iowa

[73] Assignee: Rockwell Science Center, Inc., Thousand Oaks, Calif.

[21] Appl. No.: 09/022,426

[22] Filed: Feb. 12, 1998

[51] Int. Cl.⁶ ................................................. G06F 15/316
[52] U.S. Cl. ........................... 382/278; 382/210; 359/23
[58] Field of Search .................................... 382/276, 278, 382/100, 103, 210, 211; 359/23, 24, 28

[56] References Cited

U.S. PATENT DOCUMENTS

| | | | |
|---|---|---|---|
| 3,833,281 | 9/1974 | Kumada | 350/3.5 |
| 4,637,056 | 1/1987 | Sherman et al. | 382/210 |
| 4,837,843 | 6/1989 | Owechko | 382/210 |
| 5,138,489 | 8/1992 | Paek | 382/210 |
| 5,754,691 | 5/1998 | Hong | 382/210 |
| 5,838,650 | 11/1998 | Campbell et al. | 359/10 |

*Primary Examiner*—Yon J. Couso
*Attorney, Agent, or Firm*—Kyle Eppele; James P. O'Shaughnessy

[57] ABSTRACT

A method and apparatus for correlating outputs of a plurality of environmental sensor signals to determine a situation. The method includes the steps of dividing a coherent light beam across a diameter of the light beam into a plurality of information transmission zones and modulating a portion of the light beam within at least some of the information transmission zones with a corresponding number of signals of the plurality of environmental sensor signals. The method further includes the steps of deflecting the modulated light beams of the at least some information transmission zones within a holographic memory to provide at least some correlated outputs among the plurality of environmental sensor signals and determining the situation based upon the at least some correlated outputs of the holographic memory.

50 Claims, 4 Drawing Sheets

Fig. 2

NAVIGATION SYSTEM USING HYBRID SENSOR CORRELATION SYSTEM

FIELD OF THE INVENTION

The field of the invention relates to global positioning systems and more particularly to navigation processors using the global positioning system.

BACKGROUND OF THE INVENTION

Global position systems, such as the American GPS and Russian GLONASS, are known. The NAVSTAR GPS developed by the U.S. Defense Department is a satellite-based radio navigation system which transmits information from which extremely accurate navigational calculations can be made in three-dimensional space anywhere on or near the Earth. Three-dimensional velocity can be determined with equal precision. The GPS uses 24 satellites dispersed in six, inclined, 12 hour circular orbits chosen to insure continuous 24 hour coverage world-wide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHZ and an L2 signal at a frequency of 1227.6 MHZ. The L1 and L2 signals are bi-phase modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN signal to recover the navigation data, including ephemeris data. The ephemeris data is used with a set of Kepler to precisely determine the location of each satellite.

The receiver measures a phase difference of time of arrival of signals from at least four satellites. The phase differences are used to solve a matrix of four equations. The result is a precise determination of location of the receiver in three-dimensional space.

Velocity of the receiver may be determined by a precise measurement of the L1 and L2 frequencies. The measured differences are used to solve another set of equations to determine velocity based upon the Doppler phase shift of the received signal.

While the GPS performs relatively well, there are still situations where receivers cannot adequately detect satellite signals. For instance, where a receiver is located in deep valleys, between buildings in a city or in the presence of interference, a receiver cannot detect a sufficient number of satellite signals to accurately determine position. Further, during severe weather (e.g., during electrical or heavy rain storms), GPS signals may be so severely attenuated as to be undetectable. Accordingly, a need exists for a means for integrating GPS positioning with other, more conventional, positioning techniques and for means for selecting a reliable position solution from among those techniques.

SUMMARY

A method and apparatus for correlating outputs of a plurality of environmental sensor signals to determine a situation. The method includes the steps of dividing a coherent light beam across a diameter of the light beam into a plurality of information transmission zones and modulating a portion of the light beam within at least some of the information transmission zones with a corresponding number of signals of the plurality of environmental sensor signals. The method further includes the steps of deflecting the modulated light beams of the at least some information transmission zones within a holographic memory to provide at least some correlated outputs among the plurality of environmental sensor signals and determining the situation based upon the at least some correlated outputs of the holographic memory.

DETAILED DESCRIPTION OF AN EMBODIMENT

Figure 1:
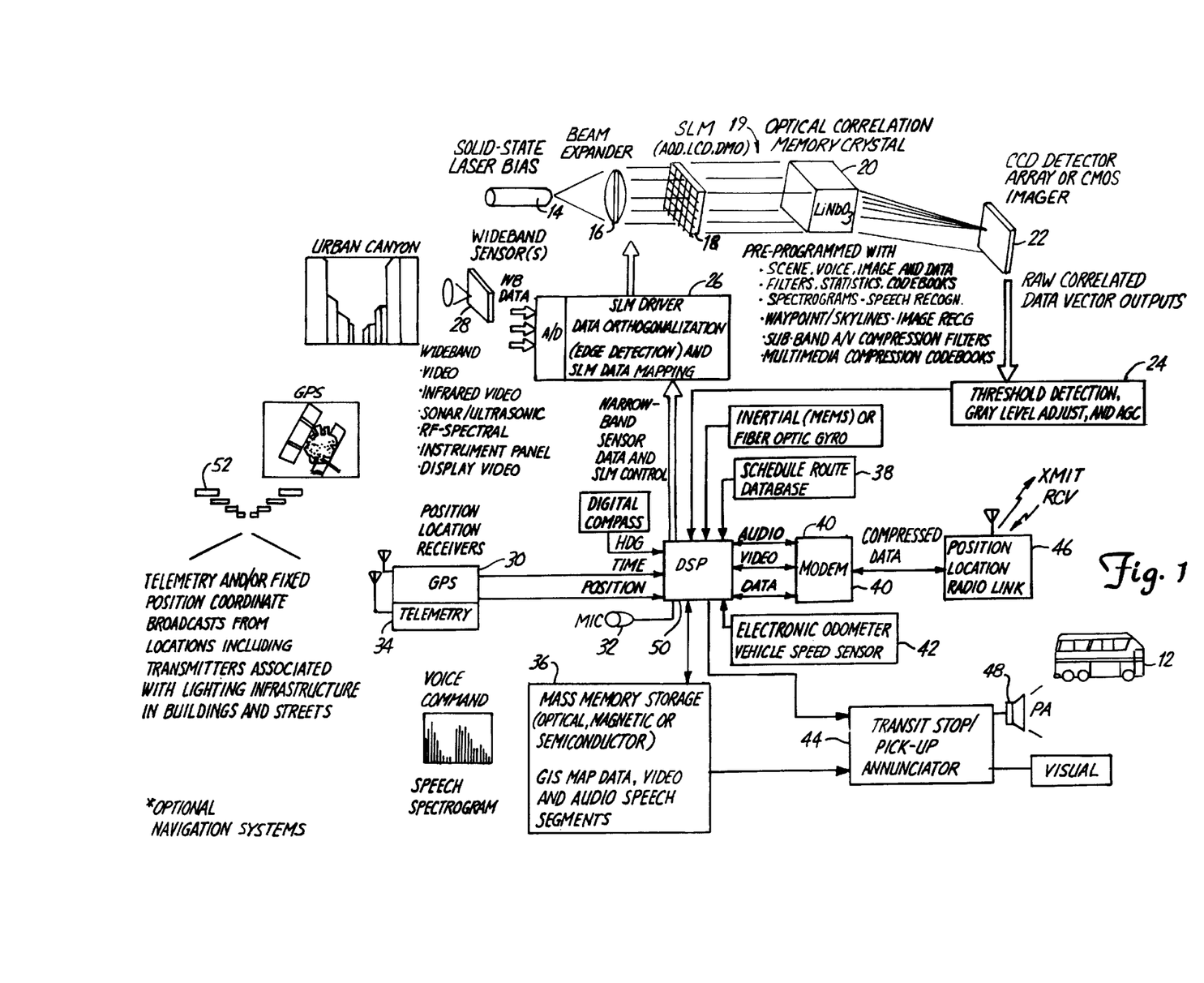
FIG. 1 depicts an embodiment of a navigation processor using a hybrid sensor correlation system in accordance with the invention.

FIG. 1 is a block diagram of one embodiment of a navigation system 10, generally, using hybrid sensor correlation. The system 10 has broad application in the field of rapidly determining and continually updating a location of a host vehicle (e.g., a bus 12). Under the embodiment, a digital signal processor 50 maintains a close approximation of geographical position based upon correlated inputs from any of a number of position-indicating sensors.

While in some embodiments, GPS may be one of the position-indicating signals as illustrated in the embodiment of FIG. 1, it may be assumed that an output from the GPS sensor 30 is not available on a continuous basis. For instance, a bus 12 operating on a city street would not be expected to receive continuous and reliable GPS positioning information because of tall buildings that may be located on either side of a street upon which the bus 12 may be traveling.

Under an illustrative embodiment, the DSP 50 may maintain a current position solution using a frequency plane correlator 19 operating in conjunction with images generated from a number of position-indicating sensors. Optical processing of optical plane data images (e.g., wideband data from video sources) using a frequency plane correlator 19 occurs much faster and more efficiently than processing of the same information using a silicon processor. The use of the frequency plane correlator represents a substantial departure from prior teachings.

The frequency plane correlator 19 may use a video imager (e.g., camera) 28 affixed to the interior or exterior of the vehicle 12 as a source of images as well as images generated from modulated data from many other sensors. The images collected by the video imager 28 may be compared with holographic images and/or filters stored in a holographic memory crystal of the illustrated navigational system 10 as a basis for determining a current location. In the case of the bus 12, the holographic filters placed in memory 20 may represent images or statistically derived filters that have been previously collected or generated from appropriate intervals (e.g., every 100 feet) along a path which the bus 12 may travel and stored along with indicia of source location within a memory of the navigational system 10.

Current images from the wideband video imager 28, and narrowband sensors 30, 32, 34 are modulated onto a laser beam from a laser 14, within a spatial light modulator (SLM) 18 and compared with a number of holographic filter images stored in a holographic memory 20. When the image from the imager 28 closely matches an image stored within the holographic memory 20, a foci of light (i.e., a correlation spot) forms on the charge coupled device (CCD) photo detector array 22.

The degree of correlation between the image from the imager 28 and the stored holographic images, may be determined by the foci intensity and location. The CCD photo detector array 22 may be used to detect a location of the correlation spot on an output plane of the holographic memory 20. Based upon the correlation spot location within the array, the identity of the previously stored holographic image may be determined. Where the stored holographic image is determined, a bus location can also be determined with great accuracy.

A threshold detector 24 may be used as a means for determining an intensity of the correlation spot. The intensity of the correlation spot may also be used as an indication of accuracy of the correlation.

In conjunction with the imager 28, other inputs (e.g., a microphone 32) may also be used as a position-indicating sensor.

A graphical representation of a voice signal may be compared with a previously stored holographic time-spectral representation of that voice signal to be used in determining a geographical location.

For example, a bus driver may recite a geographical location (e.g., a street name) as the bus passes that location to alert passengers as they approach their stop. Within the DPS 50, the speech may be converted into a two-dimensional format (e.g., a spectrogram such as that described by Yu, F. T. S. et al, 1985 "White-Light Optical Speech Spectrogram Generation", Appl. Opt., 24, pp. 836–841). DSP 50 develops a time-frequency representation and forwards the signal to SLM 26, modulating the spectrogram onto the laser beam. Where a match exists between the modulated laser beam and stored holographic image (i.e., the recited street name), a correlation spot is detected and translated by the array 22 and detector 24.

The laser 14 may be any point source solid state laser with an appropriate expanding lens. A collimating lens 16 is used to collimate the expanded coherent light from the laser 14 into an expanded light beam which, in turn, may be modulated by the SLM 18.

Figure 2:
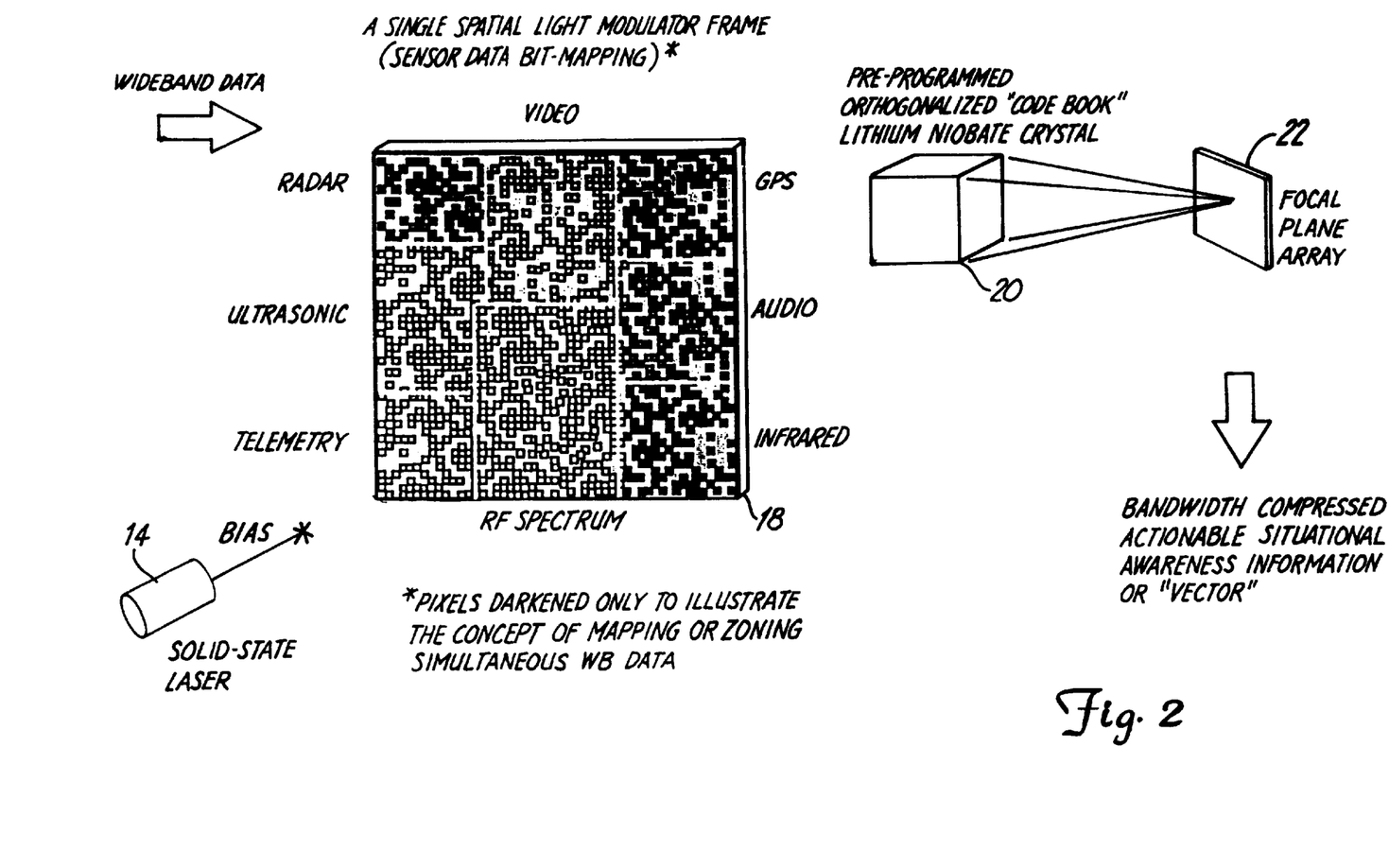
FIG. 2 depicts an embodiment of a spatial light modulator of the navigational system of FIG. 1.

FIG. 2 depicts a simplified perspective view of the SLM 18, holographic memory 20 and detector array 22. The SLM 18 may be a liquid crystal (LC) transmissive display device having a plurality of pixels elements, each of which may be modified to transmit or block light in response to input from, for example, the DSP 50. Any one of a number of devices may be used for the SLM 18. These include ferroelectric liquid crystal, twisted nematic liquid crystal, silicon membrane (deformable mirror), and magneto-optic types.

Under an illustrated embodiment, the active portion of the SLM 18 may be divided into a plurality of two-dimensional areas (information transmission zones) distributed across an active area of the SLM 18. Where an expanded laser beam passes through the zones of the SLM 18, each zone provides a means for modulating a portion of the laser beam with a signal from a particular type of position-indicating sensor. For instance, video information from the video imager 28 may be formatted and assigned to the top center of the SLM 18 as shown in FIG. 2 and may be used to modulate that portion of the laser beam passing through the top center portion of the SLM 18. Similarly, audio information may be assigned to a center right side of the SLM 18. Imaging information, including raw or otherwise preprocessed, including edge detected video from other position-indicating sensors (e.g., radar, ultrasonic imaging, telemetry, rf spectral displays, infrared imaging, or graphically represented GPS data) may be allocated to other areas of the SLM 18.

The holographic memory may be constructed of an iron doped lithium niobate (LiNbO$_3$;Fe) crystal, with an active dimension of 1 cm on a side. Holograms may be permanenty fixed within the holographic memory 20 by laser programming and static heating (see for example, D. L. Stacbler, W. J. Burk, W. Phillips, and J. J. Amodei in "Mutiple Storage and Exposure of Fixed Holograms in Fe-Doped LiNbO$_3$, Applied Physics Letters, Vol. 26, p. 182 (1985)).

The photo detector array 22 may be, for example, a charge-coupled device (CCD), CMOS imager, a self-scanned diode array, a Schottky diode array, a pyroelectric device array, or other device capable of converting optical photons into an electronic voltage or current. The array 22 may be chosen to have a resolution, or number of photoreactive elements, equal or greater to the number of templates stored within the memory 20.

Figure 3:
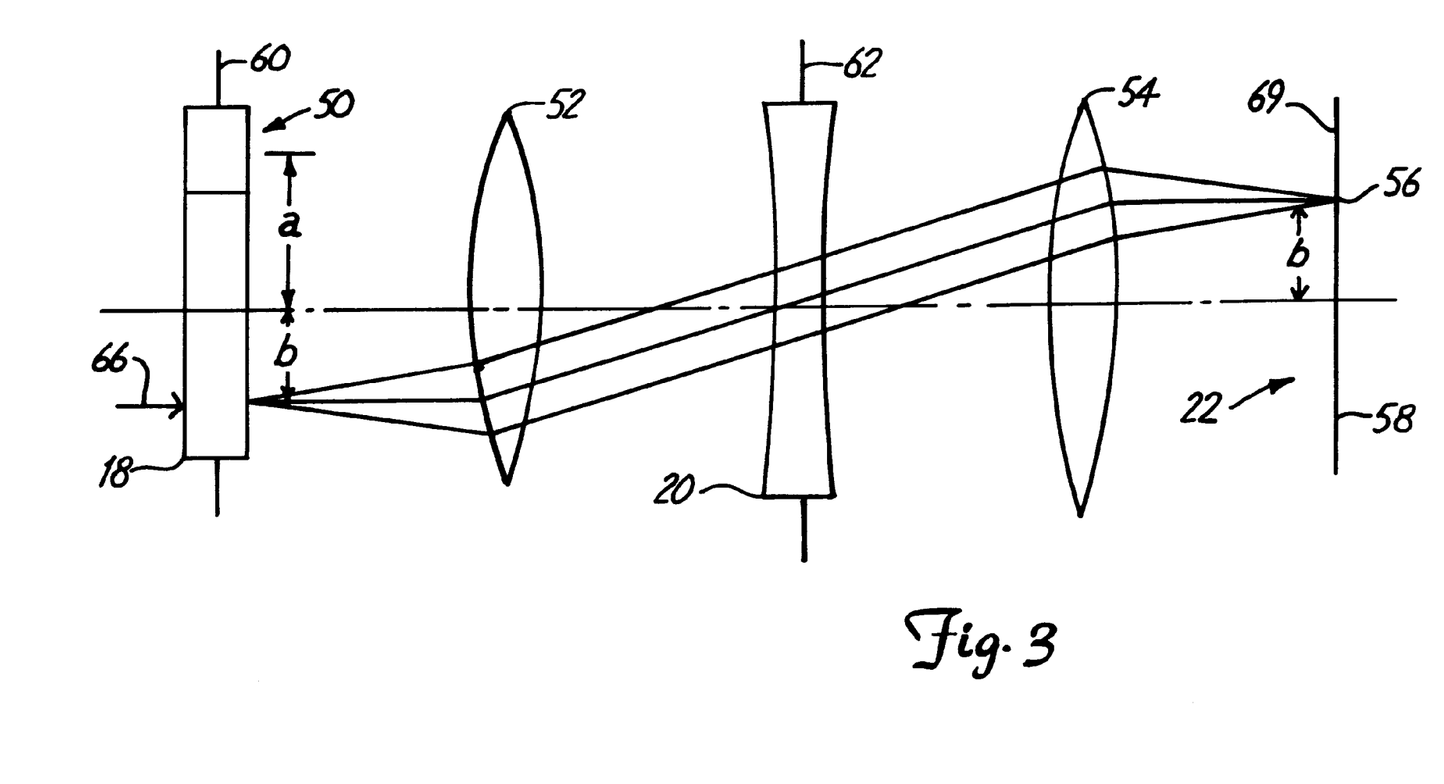
FIG. 3 depicts an embodiment of a correlation system of the navigation system of FIG. 1.

FIG. 3 provides a simplified functional view of operation of the SLM 18, holographic memory 20 and detector array 22. The combination of the structures shown in FIG. 3 depicts a basic matched Vander Lugt filter arrangement for pattern correlation. It consists of an image input device (i.e., SLM 18), lens 52, holographic memory 20, second lens 54, and detector array 22. The SLM 18 and memory 20 are each assumed to have a operational plane 60, 62. A surface 64 of the detector array 22 provides another operational plane. The three operational planes 60, 62, 64 are all assumed to be at the foci of the two lenses 52, 54. The two lenses 52, 54 may be provided separately (as shown in FIG. 3), or may be provided as a portion of the memory 20.

During use, the first lens 52 functions to provide a Fourier transform of images produced within the SLM 18 at the input Fourier transform plane (FTP) 60. The second lens 54 functions to provide an inverse Fourier transform of images produced at the FTP at the surface 64 of the array 22. The Fourier transform of a real image produced at the FTP 60 of the SLM 18 by excitation of the plane by a light beam from the laser 14 produces an interference pattern or hologram within the holographic memory 20.

If the objective were recording of a hologram in the FTP 62, then the following steps would be executed. First a representation of the information (e.g., an image) would be imposed upon a portion of the input plane 60 within a first area 50 of the SLM 18 (centered at a distance "a" from the center of the SLM 18). A coherent light source (from laser 14) may be imposed upon the first area 50 and upon a second area (designated by light beam 66) of the SLM 18. The coherent light source (laser 14) used to illuminate the image 50 is coherent with the reference beam 66 and differes from it only in amplitude and phase. The resultant hologram produced by the light through the image 50 of the first area and the beam 66 through the second area on the FTP 62 may be recorded as a holographic image in the holographic memory 20. The second lens 54 and array 22 would not be necessary for this process.

Having thereby recorded a hologram of the information to be searched, a pattern corresponding to that information sought may then be placed on the input plane 60 of the SLM 18 in a corresponding position and illuminated by a pulse of coherent light of the same wavelength from the laser 14. A basic property of a hologram is that if it is recorded by illumination of two scenes (images), x and y, and then exposed to light from x, a real or virtual image of y will appear at the output plane 64, or visa versa. In a matched filter, the beam 66 can be regarded as a point source at the FTP 60 of the SLM 18. As a result, when a matching image is imposed on the appropriate area (e.g., 50) of the SLM 18, a correlation spot 56 will appear on the array 22. This represents the autocorrelation, or matching, of the input to the filter. With suitable design, the autocorrelation spot can be made more intense than any cross correlation terms and thus can be easily detected by the array 22. The correlation spot 56 in most cases would also bear a one-to-one relationship with the source of the spot. For instance, where the point source of light beam 66 is located a distance "b" below a midpoint, the correlation spot 56 will appear a distance "b" above a midpoint of the array 22.

In the above-described case of the bus 12, an appropriate number of holographic images (e.g., 50,000) may be stored within the holographic memory 20. The images may be video images from the imager 28, audio time-spectral images from a microphone 32 or graphically developed images from any other position-indicating sensor. Telemetry transmitters 52 may be located at stationary locations (e.g., on lightpoles) and may transmit position-indicating signals to a telemetry receiver 34, which may then be converted into graphically encoded telemetry images for comparision within the holographic memory 20. For ease of detection, the telemetry signals may be converted into binary coded images that may be compared to similarly encoded holographic images.

Operational information from the GPS 30 may be processed in a similar manner. Included within a GPS image may be an indication of to the time since the last reading, the number of satellites detected and signal strength of each detected satellite signal. Holograms reflecting critical GPS parameters (e.g., the number of detected satellite signals and/or signal strength) may be used as a measure of the reliability of the GPS determination.

The SLM controller 26 functions to receive information independently and collectively from the sensors and to format the information as input to the SLM 18. The SLM controller 26 may include a separate controller (not shown) and a mapped memory (also not shown) corresponding to the pixels of the SLM 18. The mapping of the memory of the SLM controller 26 may be accomplished by the DSP 50 upon start-up and may correspond to the information transmission zones of the SLM 18. Sensor sources (e.g., imager 28) providing large amounts of data (wideband) may be written directly to the mapped memory of the SLM controller 26, which would in turn write the received data to the designated area of the SLM 18. Alternatively data written to the SLM 18 may first undergo edge detection and enhancements, providing reduced frequency of undesired cross-correlations at FPA 22.

In another embodiment, the navigation system 10 is operated as a joint transform correlator, where a source image from an imager 28 is compared with a reference image stored in a database 36. Where operated as a joint transform correlator, either the source or reference image may be converted into an inverse image and combined with the other image to (upon the occurrence of a match) provide a substantially complete cancellation of images. The corresponding holographic image stored in the holographic memory 20 and used to detect this situation may be a generic holographic image used to detect a substantially complete cancellation of source and reference images.

During operation, the SLM control 26 operating under control of the DSP 50 may simultaneously present a number of images to the image control areas of the SLM 18. When a match occurs between the input image and holographic image, a corresponding correlation spot occurs on the array 22. Where a number of correlation spots occur concurrently, the intensity of each spot may provide a correlation coefficient that may be used by the DSP to determine a relative reliability of each sensor input.

The DSP 50 may determine the identity of the input image (i.e., source sensor) and corresponding holographic image based upon a detected location of each correlation spot. The DSP 50 may also determine the degree of correlation of a holographic image with an input image by comparing an intensity of the correlation spot with a set of threshold values for the particular image.

The DSP 50 may assign a certainty index to each detected correlation spot. For example, the threshold levels may, in fact, be a number of threshold values. A correlation spot exceeding a high threshold level may be assigned a high certainty index. A correlation spot with a low threshold value may be assigned a low certainty index.

Further, since at least some of the data collected by the position-indicating sensors may be redundant, the certainty index may be used as a gauge of the reliability of the reading. For example, where the GPS receiver 30 is able to detect and form a position and velocity solution based upon detection of four or more satellites, the readings would be given a high degree of reliability. Where the GPS 30 cannot form a solution, or forms a solution based upon three or less satellites, the DPS 50 gives the GPS information a lower index of reliability.

Where the DPS 50 detects good correlation between sensor images (e.g., from the imager 28) and holographic images (as detected by the array 22 and theshold detector 24), then the DSP 50 may give a high degree of reliability to those readings. For instance, where the readings from the imager 28 are determined to have a higher degree of reliability than the GPS readings, then the DPS 50 may select the video imaging system over the GPS system as providing a better indication of geographic position. Where the imager 28 and GPS receiver 30 provide a comparable degree of certainty, then the DSP 50 may average determinations of geographic position to mitigate undercertainty generated by a mismatch of determinations.

Where the index of reliability of the sensors (including the GPS) resides at a low level, the DSP 50 may rely on inputs from a number of sources. For instance, the DSP 50 may look backwards in time to the last set of sensor readings providing a high index of reliability and calculate a current position using an input from an electronic odometer and vehicle speed sensor 42. A distance measurement from the distance and speed sensor 42 may be combined with a driver's announcements of bus stops detected through the microphone 32 to provide a better indication of bus location. Alternatively, where all (or most) position-indicating sensors provide an indication of a same relative location (even though based upon a low index of reliability) a voting protocol may be used to determine location based upon all (or most) of the sensors.

Under another embodiment of the invention, the presence of accurate position information within the DSP 50 allows the DSP 50 to retrieve bus routing information from a schedule route database 38, compare the routing information with a map database 36 and announce upcoming stops through a annunciator system 44. Access to routing information allows the DSP 50 to detect deviations from a planned schedule and transmit a summary of such deviations to a bus company scheduling controller (not shown) through a modem 40 and radio link 46.

In another embodiment of the invention (FIG. 4) a navigational system 110 may be integrated into an avionics package and function as a situational awareness processing system. The term "situation" as used herein refers to an ability of a central processor to recognize the confluence of detectable events and to react to those events using a number of predetermined strategies. While situational awareness processing will first be described in terms of environmental situations, it should be recognized that the invention has broad application in other fields.

The information collected in situational processing may be expanded to be more properly referred to as environmental information, collected from a number of environmental sensors.

Figure 4:
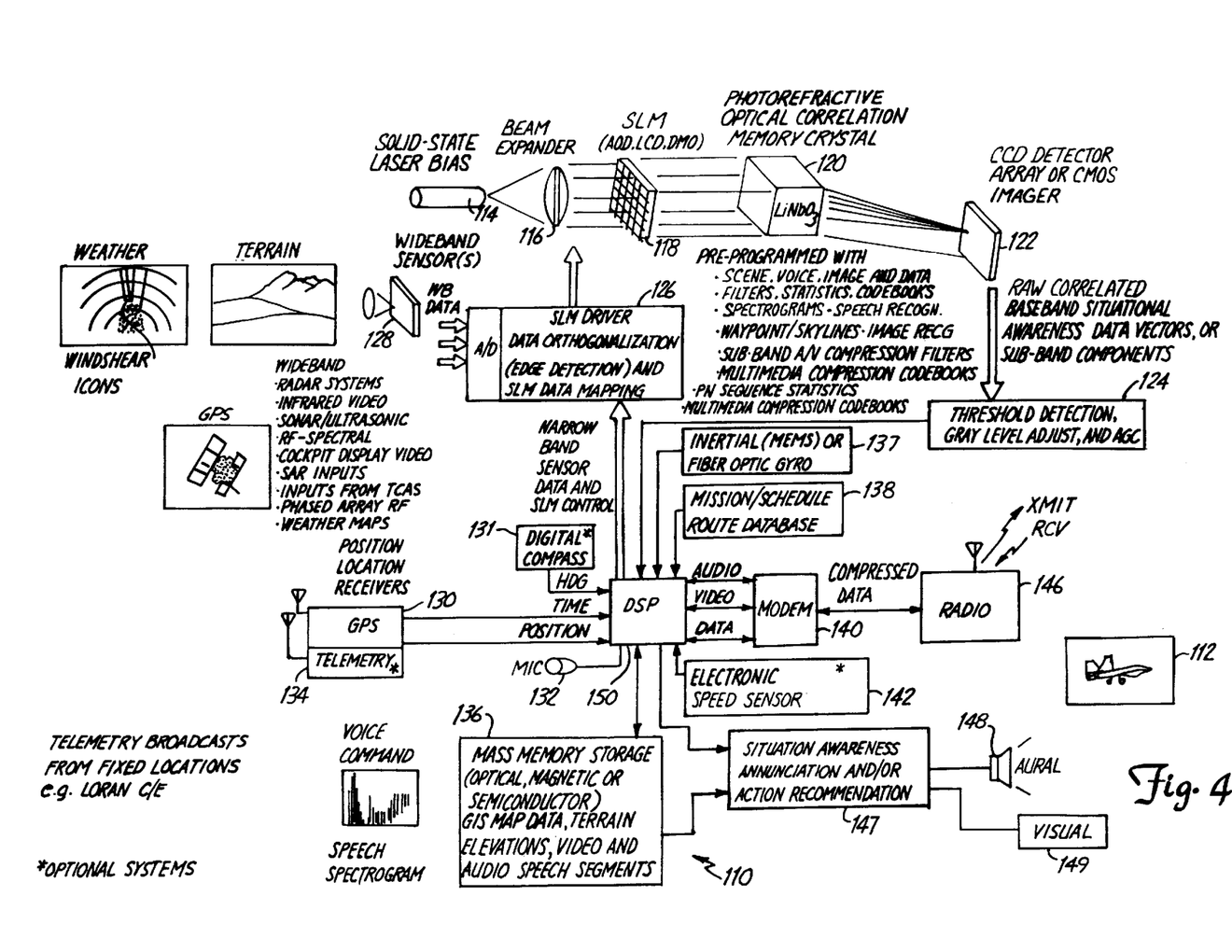
FIG. 4 depicts the navigation system of FIG. 1 under an alternate embodiment.

Environmental visual information may be provided by any of a wide range of wideband and narrowband sensing systems 128 (e.g., weather radar, infrared, terrain collision avoidance system (TCAS), sonar, ultrasonic, rf spectral, video or SAR (Synthetic Aperture Radar) inputs). While conventional radar may be used to provide an indication of the geographical environment within which the plane is operating, Doppler radar may be used to sense and define an atmospheric physical environment. Infrared, sonar, ultrasonic, rf spectral may be used in a warfare environment along with transponders and weapons detectors (other than infrared) to detect and differentiate friend from foe.

The environmental information collected may be used by the DPS 150 to sense and determine a situation based upon correlation of such environmental information. Determining a situation, as used herein, may be construed to mean the developement of cognitive data for decision making based upon analysis and comparison of data about a particular environment from a plurality of environmental sensors.

The environmental information collected may be assigned to dedicated two-dimensional, transmissive areas of the SLM 118, or may be multiplexed onto the same or a predetermined combination of areas of the SLM 118. Multiplexing may be appropriate in certain situations where the number of images is low. For instance in a warefare environment, a series of images depicting the shapes and edge detected outlines of known enemy aircraft, tanks, submarines and ships may be multiplexed onto the same predetermined transmissive area of the SLM 118. A radar image of a plane may be multiplexed into the predetermined area as could an infrared image of a tank or a sonar image of a submarine. The limited number of holograms associated with such a situation may easily be stored in the holographic memory 120 and associated with that predetermined area of the SLM 118 dedicated to threat detection.

In other cases, where the number of possible images associated with determining a particular environment is high, joint transform correlation may be used. Where joint transform correlation is used, a combination of areas of the SLM 118 may be used for the contemporaneous generation of source and reference images. Data for source images would be received from the environmental sensors. Reference images may be retrieved from mass storage 136.

A laser 114, operating through a beam expander 116 may be used to impose those environmental images onto the holographic memory 120. Correlation spots may be collected into a correlation vector for transfer to and analysis by the threshold detector 124. Outputs of the threshold detector 124 may be used by the DSP 150 to generate an index of reliability of the sensor data.

The index of reliability may be used as described above to generate an estimate of location and/or relavent environment. Additional sensors such as a digital compass 131 and inertial gyro 137 may be used to substantially improve locational accuracy. External temperature sensors (not shown), or even radiation detectors (also not shown) may be used to further enhance an ability to detect and analyze and external environmental events (e.g., a nuclear bomb blast).

Positional information determined on the location of the airplane 112 may also be used to enhance situational awareness by annunciating situational warnings or informative annunciations. For instance, a determination of location may be used to retrieve (e.g., from mass storage 136) and determine elevations of nearby geological or man-made structures which may be combined with altitude and direction data to generate a collision warning to the pilot in the case where the plane 112 were being flown too low in the direction of the mountains.

Further, a knowledge of location in combination with pilot audio information may be used to determine a situation and to generate informative information. For example, where the pilot voices the word "airport", the DSP 150 may identifying the spoken word through the holographic memory 120. The DSP 150 may determine the situation to be that the pilot wants to know the location of the nearest airport. In response, the DSP 150 may initiate an announcement of the direction and heading of the nearest airport as well as a distance to the airport.

Under normal operating conditions, the DSP 150 may retrieve an identifier of an intended airport from a route database 138 and provide vector information to that airport. Where the pilot enunciates an emergency, or the DSP 150 detects an abnormal condition (e.g., rapid loss of altitude or airspeed, fire, power loss, etc.), the DSP 150 may identify a new situation and may automatically vector the pilot to the nearest airport by searching a map within the database 136 for the nearest airport.

Another feature of the invention is an ability of the DSP 150 to collect and rapidly analyze flight parameters and correlate that information with environmental conditions. For instance, the DSP 150 may collect speed, inertial data, plane control surface position, altitude, etc. and combine such parameters into a matrix (e.g., binary, pictorial, graphical line segments, etc).

Reference matrices may be created comparing two or more features of that matrix based upon maximum operating envelope parameters of the airplane 112 and stored as holograms with the memory 120. The flight parameters may be modulated onto the laser beam in the SLM 118 and compared with airplane performance limitations within the holographic memory 120.

Where aircraft operating parameter approach airplane limitations, the DSP 150 may determine that the situation requires immediate attention in the form of a warning to the pilot. The relavent parameters may be transferred to the situational processor 147 and the condition evaluated. In response to the situation, a warning may be issued by the audio annunciator 148 or displayed on a heads-up display 149.

For instance during a dive, airspeed may be compared to a rate of descent and altitude and the maximum g-force necessary to pull out of the dive may be be calculated and compared to the g-force rating of the airplane 112, or the tolerance of the pilot. Where the calculated value approaches the limit, the pilot may be warned via the aural 148 or visual 149 annunciator.

Further environmental sensors, such as the Doppler radar, may be used to detect situations such as microbursts and downdrafts. Such features would be extremely important where a plane is about to land, but would also be valuable in avoiding "air pockets" during normal flight.

While the detection of an amorphous mass of a downdraft or microburst presented on a Doppler radar image may be somewhat more difficult to identify than predetermined images, such images are known to generally occupy known shapes (e.g., an ellipse, rounded rectangle, etc.). Further the intense Doppler color and/or contrast changes indicative of downdrafts may be easily recognized amidst a surrounding background image.

On its simplest level complex shapes of environmental sensors (e.g., Doppler radar images) may be detected through use of a relatively small number of holograms that may be used to represent an range of expected values. Alternatively, more computationally intensive correlation processes, such as feature extraction or weighted neural networks, may be used for searching images for important predetermined features (see, for example, U.S. Pat. No. 5,220,622 to Scarr).

It should be appreciated by a reader that while locational information may be ordered using correlation coefficients, those correlated outputs affecting life and safety would not be handled similarly. For instance the correlated outputs indicating an impending crash would obviously be handled separately and on an expedited basis. Where a certainty index would still be appropriate for evaluating the likelihood of the evaluated situation, a threshold value for safety-related correlated paramaters would obviously be given a much lower threshold and a much higher priority than navigational processing.

In another embodiment, the situational awareness processor may be applied to everyday activies, in general (e.g., driving, manufacturing, business, etc.). For example, where a driver on a highway is following another vehicle, under adverse condictions the situational processor may be used to advise the driver of a safe distance to be maintained between the driver's vehicle and the vehicle ahead. A laser or ultrasonic transducer as examples (functioning as a situational sensor) may be used to determine a distance between the driver's vehicle and the other vehicle. A second situational sensor (e.g., a precipitation detector) may be used to determine a first safe distance on wet roads. The laser and precipitation detector may be combined with a temperature sensor to detect a second safe distance on icy roads.

In the manufacturing environment, measured parameters may be compared to determine and identify manufacturing problems. In a refinery, for instance, pressure and temperature profiles may be simultaneously monitored for combinations that are outside of safe operating limits, as was described previously for the avionics application.

In the business environment, a plurality stock market indicators may be simultaneously monitored to track investments. For instance, major oil discoveries are known to adversely affect energy stocks. The situational processor may be used to weight information from a plurality of real-time wire service news reports, SEC filings, graphical charts and video display screens, depicting fundamental and technical indicators to anticipate investment trends.

A specific embodiment of a method and apparatus of providing a situational awareness control system using hybrid sensor correlation according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A method of correlating outputs of a plurality of environmental sensor signals to determine a situation, such method comprising the steps of:

dividing a coherent light beam across a diameter of the light beam into a plurality of information transmission zones;

modulating a portion of the light beam within at least some of the information transmission zones with a corresponding number of signals of the plurality of environmental sensor signals;

deflecting the modulated light beams of the at least some information transmission zones within a holographic memory to provide at least some correlated outputs among the plurality of environmental sensor signals; and determining the situation based upon the at least some correlated outputs of the holographic memory.

2. The method of correlating a plurality of environmental sensor signals as in claim 1 wherein the steps of modulating the light beam further comprising imposing an image on the portion of the light beam within each of the at least some information transmission zones.

3. The method of correlating a plurality of environmental sensor signals as in claim 1 wherein the steps of modulating and deflecting further comprise using frequency plane correlation.

4. The method of correlating a plurality of environmental sensor signals as in claim 1 wherein the steps of modulating and deflecting further comprise using joint transform correlation.

5. The method of correlating a plurality of environmental sensor signals as in claim 1 further comprising correlating a spectrogram with a predetermined geographical location.

6. The method of correlating a plurality of environmental sensor signals as in claim 5 wherein the steps of correlating a an image of a spectrogram with a predetermined geographical location further comprises providing a situational awareness annunciation regarding the correlation.

7. The method of correlating a plurality of environmental sensor signals as in claim 5 further comprising generating the spectrogram based upon an audio input.

8. The method of correlating a plurality of environmental sensor signals as in claim 5 further comprising determining the predetermined geographical location based upon a global positioning system.

9. The method of correlating a plurality of environmental sensor signals as in claim 5 further comprising determining the predetermined geographical location based upon correlation of an image from an environmental sensor and a stored image with a holographic image.

10. The method of correlating a plurality of environmental sensor signals as in claim 5 further comprising determining the predetermined geographical location based upon correlation of a radar image with a holographic image.

11. The method of correlating a plurality of environmental sensor signals as in claim 5 further comprising determining the predetermined geographical location based upon correlation of a video image or its time or frequency components with a holographic image.

12. The method of correlating a plurality of environmental sensor signals as in claim 5 further comprising determining the predetermined geographical location based upon correlation of a infrared image with a holographic image.

13. The method of correlating a plurality of environmental sensor signals as in claim 5 further comprising determining the predetermined geographical location based upon correlation of a ultrasonic image with a holographic image.

14. The method of correlating a plurality of environmental sensor signals as in claim 5 further comprising assigning a correlation coefficient to each correlated output.

15. The method of correlating a plurality of environmental sensor signals as in claim 5 further comprising evaluating the at least some correlated outputs based upon an assigned index of reliability.

16. Apparatus for correlating a plurality of environmental sensor signals to determine a situation, such apparatus comprising:
    means for dividing a coherent light beam across a diameter of the light beam into a plurality of information transmission zones;
    means for modulating a portion of the light beam within at least some of the information transmission zones with a corresponding number of signals of the plurality of environmental sensor signals;
    means for deflecting the modulated light beams of the at least some information transmission zones within a holographic memory to provide at least some correlated outputs among the plurality of environmental sensor signals; and
    means for determining the situation based upon the at least some correlated outputs of the holographic memory.

17. The apparatus for correlating a plurality of environmental sensor signals as in claim 16 wherein the means for modulating the light beam further comprising means for imposing an image on the portion of the light beam within each of the at least some information transmission zones.

18. The apparatus for correlating a plurality of environmental sensor signals as in claim 16 wherein the means for modulating and deflecting further comprises means for using frequency plane correlation.

19. The apparatus for correlating a plurality of environmental sensor signals as in claim 16 wherein the means for modulating and deflecting further comprises means for using joint transform correlation.

20. The apparatus for correlating a plurality of environmental sensor signals as in claim 16 further comprises means for correlating a spectrogram with a predetermined geographical location.

21. The apparatus for correlating a plurality of environmental sensor signals as in claim 20 wherein the means for correlating a an image of a spectrogram with a predetermined geographical location further comprises means for providing a situational awareness annunciation regarding the correlation.

22. The apparatus for correlating a plurality of environmental sensor signals as in claim 20 further comprising means for generating the spectrogram based upon an audio input.

23. The apparatus for correlating a plurality of environmental sensor signals as in claim 20 further comprising means for determining the predetermined geographical location based upon a global positioning system.

24. The apparatus for correlating a plurality of environmental sensor signals as in claim 20 further comprising means for determining the predetermined geographical location based upon correlation of an image from an environmental sensor and a stored image with a holographic image.

25. The apparatus for correlating a plurality of environmental sensor signals as in claim 20 further comprising means for determining the predetermined geographical location based upon correlation of a radar image with a holographic image.

26. The apparatus for correlating a plurality of environmental sensor signals as in claim 20 further comprising means for determining the predetermined geographical location based upon correlation of a video image with a holographic image.

27. The apparatus for correlating a plurality of environmental sensor signals as in claim 20 further comprising means for determining the predetermined geographical location based upon correlation of a infrared image with a holographic image.

28. The apparatus for correlating a plurality of environmental sensor signals as in claim 20 further comprising means for determining the predetermined geographical location based upon correlation of a ultrasonic image with a holographic image.

29. The apparatus for correlating a plurality of environmental sensor signals as in claim 20 further comprising means for assigning a correlation coefficient to each correlated output.

30. The apparatus for correlating a plurality of environmental sensor signals as in claim 20 further comprising means for evaluating the at least some correlated outputs based upon an assigned index of reliability.

31. Apparatus for correlating a plurality of environmental sensor signals to determine a situation, such apparatus comprising:
    a coherent light beam;
    a spatial light modulator which divides the light beam across a diameter of the light beam into a plurality of information transmission zones and which modulates a portion of the light beam within at least some of the information transmission zones with a corresponding number of signals of the plurality of environmental sensor signals;
    a holographic memory containing a hologram which deflects the modulated light beams of the at least some information transmission zones within a holographic memory to provide at least some correlated outputs among the plurality of environmental sensor signals; and
    a processor which determines the situation based upon the at least some correlated outputs of the holographic memory.

32. The apparatus for correlating a plurality of environmental sensor signals as in claim 31 further comprises a spectrum processor which correlates a spectrogram with a predetermined geographical location.

33. The apparatus for correlating a plurality of environmental sensor signals as in claim 32 wherein the spectrum processor which correlates an image of a spectrogram with a predetermined geographical location further comprises an audio transducer which provides a situational awareness annunciation regarding the correlation.

34. The apparatus for correlating a plurality of environmental sensor signals as in claim 32 further comprising a global position system receiver which determines the predetermined geographical location based upon a global positioning system.

35. The apparatus for correlating a plurality of environmental sensor signals as in claim 32 further comprising a radar transceiver.

36. The apparatus for correlating a plurality of environmental sensor signals as in claim 32 further comprising a video camera receiver.

37. The apparatus for correlating a plurality of environmental sensor signals as in claim 32 further comprising an infrared receiver.

38. The apparatus for correlating a plurality of environmental sensor signals as in claim 32 further comprising an ultrasonic receiver.

39. A method of correlating a plurality of situational sensor signals to determine a situation, such method comprising the steps of:

dividing a coherent light beam across a diameter of the light beam into a plurality of information transmission zones;

modulating a portion of the light beam within at least some of the information transmission zones with a corresponding number of signals of the plurality of situational sensor signals;

deflecting the modulated light beams of the at least some information transmission zones within a holographic memory to provide at least some correlated outputs among the plurality of situational sensor signals; and determining the situation based upon the at least some correlated outputs of the holographic memory.

40. The method of correlating a plurality of situational sensor signals as in claim 39 wherein the steps of modulating the light beam further comprising imposing an image on the portion of the light beam within each of the at least some information transmission zones.

41. The method of correlating a plurality of situational sensor signals as in claim 39 wherein the steps of modulating and deflecting further comprise using frequency plane correlation.

42. The method of correlating a plurality of environmental sensor signals as in claim 39 wherein the steps of modulating and deflecting further comprise using joint transform correlation.

43. Apparatus for correlating a plurality of situational sensor signals to determine a situation, such apparatus comprising:

means for dividing a coherent light beam across a diameter of the light beam into a plurality of information transmission zones;

means for modulating a portion of the light beam within at least some of the information transmission zones with a corresponding number of signals of the plurality of situational sensor signals;

means for deflecting the modulated light beams of the at least some information transmission zones within a holographic memory to provide at least some correlated outputs among the plurality of situational sensor signals; and means for determining the situation based upon the at least some correlated outputs of the holographic memory.

44. The apparatus for correlating a plurality of situational sensor signals as in claim 43 wherein the means for modulating the light beam further comprises means for imposing an image on the portion of the light beam within each of the at least some information transmission zones.

45. The apparatus for correlating a plurality of situational sensor signals as in claim 43 wherein the means for modulating and deflecting further comprises means for using frequency plane correlation.

46. The apparatus for correlating a plurality of environmental sensor signals as in claim 43 wherein the means for modulating and deflecting further comprise means for using joint transform correlation.

47. Apparatus for correlating a plurality of situational sensor signals to determine a situation, such apparatus comprising:

a spatial light modulator which divides a coherent light beam across a diameter of the light beam into a plurality of information transmission zones and which modulates a portion of the light beam within at least some of the information transmission zones with a corresponding number of signals of the plurality of situational sensor signals;

a holographic memory containing a plurality of holograms which deflects the modulated light beams of the at least some information transmission zones within a holographic memory to provide at least some correlated outputs among the plurality of situational sensor signals; and a processor which determines the situation based upon the at least some correlated outputs of the holographic memory.

48. A method of correlating a plurality of position-indicating signals to determine a geographical position, such method comprising the steps of:

dividing a coherent light beam across a diameter of the light beam into a plurality of information transmission zones;

spatially modulating a portion of the light beam within at least some of the information transmission zones with a corresponding number of signals of the plurality of position-indicating signals;

deflecting the modulated light beams of the at least some information transmission zones within a holographic memory to provide at least some correlated outputs among the plurality of position-indicating signals; and correlating geographical position based upon the at least some correlated outputs of the holographic memory.

49. Apparatus for correlating a plurality of position-indicating signals to determine a geographical position, such apparatus comprising:

means for dividing a coherent light beam across a diameter of the light beam into a plurality of information transmission zones;

means for spatially modulating a portion of the light beam within at least some of the information transmission zones with a corresponding number of signals of the plurality of position-indicating signals;

means for deflecting the modulated light beams 0 the at least some information transmission zones within a holographic memory to provide at least some correlated outputs among the plurality of position-indicating signals; and means for correlating geographical position based upon a detected output of the holographic memory.

50. Apparatus for correlating a plurality of position-indicating signals to determine a geographical position, such apparatus comprising:

a coherent light source;

a spatial light modulator which divides the light beam across a diameter of the light source into a plurality of information transmission zones;

a modulation processor which modulating a portion of the light beam within at least some of the information transmission zones with a corresponding number of signals of the plurality of position-indicating signals;

a holographic memory which deflects the modulated light beams of the at least some information transmission zones within a holographic memory to provide at least some correlated outputs among the plurality of position-indicating signals; and a photodetector array which correlates geographical position based upon a detected output of the holographic memory.

* * * * *